Aug. 27, 1963  G. F. SKALA  3,102,192
METHOD AND APPARATUS FOR DETECTING ORGANIC VAPORS AND GASES
Filed Sept. 30, 1960
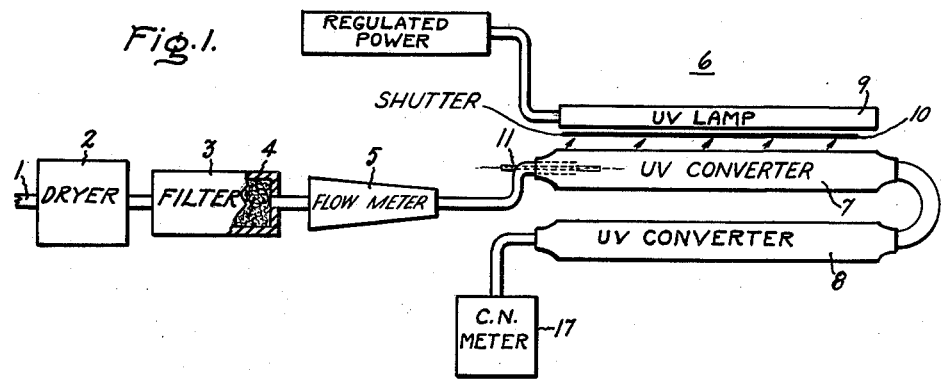
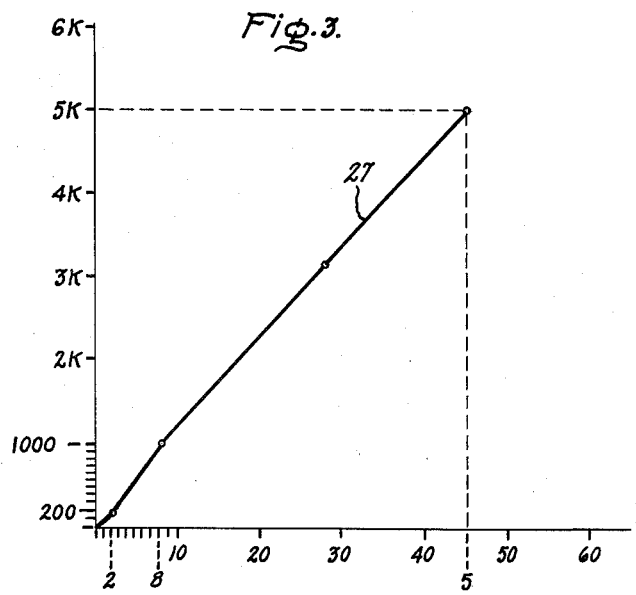
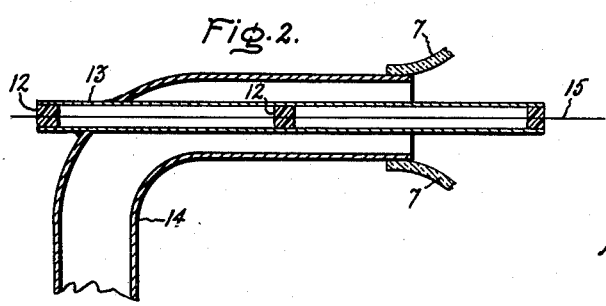
Inventor
George F. Skala
by Paul A. Frank
His Attorney

United States Patent Office 3,102,192
Patented Aug. 27, 1963

3,102,192
METHOD AND APPARATUS FOR DETECTING ORGANIC VAPORS AND GASES
George F. Skala, Scotia, N.Y., assignor to General Electric Company, a corporation of New York
Filed Sept. 30, 1960, Ser. No. 59,719
4 Claims. (Cl. 250—43.5)

This invention relates to a method and apparatus for measuring and detecting certain organic vapors and gases and, more particularly, for detecting unsaturated hydrocarbons by converting the same into airborne particulates, the concentration of which is measured as an indication of the gas or vapor concentration.

The term "airborne particulate," as utilized in the instant application, is intended to encompass both solid particles and molecular aggregates of a vapor which are suspended in a carrier gas.

Infrared spectroscopy, spectrophotometry, X-ray absorption, mass spectrometry, and numerous other techniques have been used in the past to detect and measure organic vapors and gases. In varying degrees, all of these detecting and measuring devices have enjoyed some success. Nevertheless, all have suffered from one or more shortcomings, such as lack of sensitivity, lack of speed, and have required complex and expensive equipment. For these and other reasons, a need has long existed for instrumentality which is accurate, sensitive, of simple construction, and inexpensive to manufacture.

Recent investigations have led to an extremely sensitive method for detecting hydrocarbon gases and vapors which is based on the conversion of the gas or vapor to airborne particulates of the condensation nuclei type and the subsequent measurement of the nuclei concentration by means of known condensation nuclei measuring techniques.

The term "condensation nuclei," as utilized in this specification, is a generic name given to those small airborne particles which are characterized by the fact that they serve as the nuclei on which a fluid, such as water for example, condenses to form droplets. The condensation nuclei, as understood in the art, encompasses particles ranging in size from $1 \times 10^{-4}$ centimeter radius to $1 \times 10^{-8}$ centimeter radius, although the most significant portion numerically of this range lies between $5 \times 10^{-5}$ and $5 \times 10^{-7}$ centimeter radius.

It is an object of this invention, therefore, to provide a method and apparatus for the improved detection and measurement of gases and vapors by means of photochemical conversion.

It is another object of this invention to provide an improved method and apparatus for detecting and measuring unsaturated hydrocarbons.

Other objects and advantages of the invention will become apparent as the description thereof proceeds.

The foregoing objects and advantages of this invention are accomplished and the invention practised by passing a gas stream containing the hydrocarbon gas or vapor through a beam of ultraviolet light. Traces of mercury vapor are also introduced into the sample stream and, in conjunction with the ultraviolet radiation, convert the hydrocarbon gas or vapor into condensation nuclei particles. The particles are then measured by a condensation nuclei meter to provide indication of the hydrocarbon concentration.

The features of this invention which are believed to be novel are set forth with particularity in the appended claims.

The invention itself, however, both as to its organization and method of operation, together with further objects and advantages thereof, may best be understood by reference to the following description taken in connection with the accompanying drawing, in which:

FIG. 1 is a schematic illustration of a device for detecting and measuring hydrocarbons;

FIG. 2 is a detailed showing of a portion of the device of FIG. 1, and

FIG. 3 is a graph showing the relationship between hydrocarbon concentration in parts per million and the particle concentration as produced by the converting device.

An apparatus for carrying the invention into effect is illustrated generally in FIG. 1 and comprises an instrumentality by means of which a hydrocarbon gas or vapor, such as the unsaturated hydrocarbon cyclohexene, for example, is converted photochemically to form small airborne particulates. To this end, a sample atmosphere or gaseous stream containing, or suspected of containing, the hydrocarbon gas or vapor is introduced through an input conduit 1 to a dryer 2 which removes all excess moisture from the stream. The dry gas stream passes through a filter 3 in which all ambient airborne particles are removed. Filter 3 is filled with a fibrous material 4 which removes substantially all of the particles without affecting the hydrocarbons which are in gaseous or vapor form. In this manner, all subsequently measured condensation nuclei particles are due to the conversion of the hydrocarbon gases and not due to an ambient background population. The gas stream then passes through a flow meter, indicated generally at 5, to determine the gas flow velocity, a parameter which is of importance in calibrating the instrumentality.

The sample atmosphere or gas stream containing the hydrocarbon gases or vapors then passes through a converter unit, shown generally at 6, wherein the vapors and gases are converted to airborne particles by the combined action of ultraviolet irradiation in the presence of minute traces of mercury (Hg) vapor. The ultraviolet converter comprises two quartz tubes 7 and 8 which are pervious to U.V. positioned in an ultraviolet radiation field produced by an U.V. source 9, energized from a source of regulated A.C. power indicated by the rectangle so marked. The ultraviolet source 9 comprises a low pressure mercury vapor lamp producing ultraviolet radiation concentrated in the 2537 Angstrom (A.) band. A movable shutter 10 is positioned between ultraviolet source 9 and tubes 7 and 8 to control the degree of exposure and the intensity of the radiation field. Shutter 10 is selectively withdrawn to expose more or less of the tubes to the ultraviolet radiations and thereby control the degree of irradiation and, hence, the degree of conversion of the hydrocarbons.

A source 11 for injection minute traces of mercury into the gas stream is positioned in tube 7 to initiate the conversion of the hydrocarbon vapors to particulates. The exact manner in which the mercury does so is not fully understood at this time. An operational theory is set forth in detail later. It is sufficient to state at this point that it has been found that the injection of a minute quantity of mercury vapor into the gas stream results in conversion of the hydrocarbons, whereas the exposure of the hydrocarbon vapors and gases to ultraviolet radiations alone does not produce any conversion. Mercury source 11 is illustrated in greater detail in FIG. 2 and comprises a thin copper tube 13 extending into and brazed to an inlet conduit 14 extending into the quartz tube 7. Supported in the tube 13 by means of the insulating plugs 12 is a thin copper wire 15 which extends beyond the tube 13 and into the quartz tube 7. The tip of the copper wire 15 is coated with a mercury amalgam, and this amalgam releases mercury into the gas stream flowing through the conduit 14 and the quartz tube 7. The amalgamated copper wire 15 may be produced in any number of well known ways, and one such method comprises positioning a thin copper wire in a pool of mercury for a period of several days to insure sufficient alloying for this purpose.

The particles formed by conversion of the hydrocarbon gases or vapors, such as cyclohexene, octene, toluene, benzene, etc., are brought to a condensation nuclei measuring device, shown at 17, wherein the particle concentration is measured to provide an indication of the gas or vapor concentration. The condensation nuclei measuring device may be one of several well known types and includes a humidifying device to bring the nuclei particle bearing gaseous stream to 100% relative humidity. The humidified sample is then subjected to an adiabatic expansion which cools the gas and produces a controlled degree of supersaturation. The supersaturated condition is, of course, an unstable one so that the excess water vapor condenses about the suspended airborne particles to form droplets which grow rapidly in size and abstract sufficient water vapor to reduce the supersaturated level to 100% humidity at the new temperature. The droplet cloud thus formed about the airborne particles is measured by means of an electrooptical system which includes a light projection system for projecting a beam of light which is scattered by the droplets to a degree determined by the droplet density. A photosensitive device intercepts the scattered light and produces an output current, which current may be directly calibrated in parts per million of the gas or vapor. A condensation nuclei measuring device such as this is described in U.S. Patent No. 2,684,008, issued July 20, 1954, to Bernard Vonnegut. A similar condensation nuclei measuring device is described in an article entitled "Cloud Chamber for Counting Nuclei in Aerosols," by Bernard G. Saunders in Review of Scientific Instruments, vol. 27, No. 5, May 1956, pages 273–277. In the condensation nuclei measuring device described in the Saunders article, supra, periodically actuated solenoid valves control the admission of the humidified aerosol into the device and its subsequent expansion to form the droplet cloud. The droplet cloud measured either photographically or electro-optically provides an indication which is a measure of the particle concentration. In addition to these devices, it will be understood by those skilled in the art that many other and different types of nuclei measuring devices may be used in the gas detecting and measuring apparatus illustrated and described in the instant application.

As was pointed out above, the gas concentration in parts per million (p.p.m.) may be obtained from the particle concentration measured in meter 17. Curve 27 of FIG. 3 illustrates a typical relationship between the gas concentration in parts per million along the abscissa and the particles per cubic centimeter along the ordinate. Curve 27 shows the relationship between these two parameters for an unsaturated hydrocarbon such as cyclohexene. A similar relationship has been found to exist for other hydrocarbons, including toluene, octane, and benzene. It can be seen from the curve of FIG. 3 that the hydrocarbon vapor and gas detecting instrumentality of FIG. 1 is an extremely useful and sensitive device capable of detecting hydrocarbon gas or vapor concentrations as low as two parts per million.

While it is not intended that the scope of the invention be limited by any particular theory of operation, it is believed that the conversion is based on the following mechanism, which takes place when the sample atmosphere or gas stream is exposed to ultraviolet radiation in the presence of traces of mercury vapor. It is believed that the mercury atoms absorb radiation from lamp 9 and are raised to a more energetic state, since it is a well known fact that mercury vapor very strongly absorbs radiations of its own wavelength emitted by ultraviolet mercury lamp 9. On collision with a hydrocarbon molecule, the energized mercury atoms transfer sufficient energy to the hydrocarbon atoms to break the hydrogen bond in the hydrocarbon. Thus, the double bonds of unsaturated hydrocarbons are easily broken by impact with the activated mercury. Once the hydrogen bond is broken, conversion takes place by oxidation, isomerization, polymerization, and dimerization. The product of this conversion has a low enough vapor pressure so that the molecules conglomerate into particulates which act as condensation nuclei and may be measured in conventional condensation nuclei devices such as those described above.

In order to establish the validity of this method of converting hydrocarbon gases and vapors by the combined effect of ultraviolet radiation and minute traces of mercury, an instrumentality such as that illustrated in FIG. 1 was assembled with the exception of the mercury source 11 for injecting minute traces of mercury into the gas stream. Various hydrocarbons, such as cyclohexene, octene, diisobutylene, toluene, benzene, etc., were passed through the converter in varying concentrations. The particle concentration was then measured in a condensation nuclei measuring device. It was found that in the absence of traces of mercury, no conversion took place even though as much as 3500 parts per million of cyclohexene, etc. were injected into the gas stream undergoing the ultraviolet radiation. Subsequently, with the same assembly, but with the addition of the mercury source 11, it became possible to detect as little as two parts per million of the hydrocarbon as illustrated by curve 27 of FIG. 3. It can be seen, therefore, that the combination of ultraviolet radiation and a minute trace of mercury in the gas stream bearing the hydrocarbon vapors and gases produces an extremely sensitive instrumentality.

From the foregoing, it is apparent that a novel, simple, and highly sensitive instrumentality for detecting hydrocarbon vapors and gases such as the unsaturated hydrocarbons, of which cyclohexene, octene, toluene, and benzene are examples, has been provided and constitutes a valuable and substantial contribution to the art.

While a particular embodiment of this invention has been shown, it will, of course, be understood that it is not limited thereto, since many modifications, both in the circuit arrangement and in the instrumentality employed, may be made. It is contemplated by the appended claims to cover any such modifications as fall within the true spirit and scope of this invention.

What I claim as new and desire to secure by Letters Patent of the United States is:

1. The method of detecting the presence of a hydrocarbon gas or vapor in a gas stream which comprises filtering the gas stream to remove ambient airborne particles, converting the hydrocarbon gas or vapor to airborne particles by the combined reaction of ultraviolet radiation in the presence of mercury, and measuring the concentration of the particles.

2. The method of measuring the concentration of a hydrocarbon gas or vapor in an atmosphere which comprises filtering the atmosphere to remove ambient airborne particles, subjecting the filtered atmosphere to the combined reaction of ultraviolet radiation in the presence of mercury to convert the hydrocarbon gas or vapor to airborne particles, and measuring the concentration of the particles.

3. In an apparatus for detecting the presence of a hydrocarbon gas or vapor in an atmosphere which comprises means for establishing a flow of the atmosphere, means for filtering the atmosphere to remove ambient airborne particles, means for introducing mercury into the flowing atmosphere, ultraviolet means for irradiating the flowing atmosphere and mercury to convert the hydrocarbon gas or vapor to airborne particles, and means for measuring the concentration of such particles.

4. Apparatus for measuring the concentration of a hydrocarbon gas or vapor of a class consisting of cyclohexene, octene, toluene, and benzene in an atmosphere which comprises means for drying the atmosphere to remove water vapor therefrom, filtering means to remove ambient airborne particles from the atmosphere, means for injecting a minute trace of mercury into the atmosphere, ultraxiolet means for irradiating the combination of the atmosphere and the mercury to form airborne particles thereon, and means for measuring the concentration of such particles.

References Cited in the file of this patent

UNITED STATES PATENTS

| | | |
|---|---|---|
| 1,844,421 | Buttolph | Feb. 9, 1932 |
| 2,684,008 | Vonnegut | July 20, 1954 |
| 2,755,388 | Weisz | July 17, 1956 |
| 2,774,652 | Vonnegut | Dec. 18, 1956 |
| 2,791,901 | Rich | May 14, 1957 |
| 2,830,016 | Cier et al. | Apr. 8, 1958 |
| 2,897,059 | Van Luik | July 28, 1959 |
| 2,915,939 | Van Luik | Dec. 8, 1959 |
| 2,956,435 | Rich | Oct. 18, 1960 |